United States Patent
Jung et al.

(10) Patent No.: US 11,200,075 B2
(45) Date of Patent: Dec. 14, 2021

(54) ARTIFICIAL INTELLIGENCE APPARATUS AND METHOD FOR EXTRACTING USER'S CONCERN

(71) Applicant: LG ELECTRONICS INC., Seoul (KR)

(72) Inventors: Boosoon Jung, Seoul (KR); Soora Bang, Seoul (KR); Woocheol Chung, Seoul (KR); Bomi Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/730,818

(22) Filed: Dec. 30, 2019

(65) Prior Publication Data

US 2021/0173680 A1 Jun. 10, 2021

(30) Foreign Application Priority Data

Dec. 5, 2019 (KR) .......................... 10-2019-0160595

(51) Int. Cl.
*G06F 9/451* (2018.01)
*G06F 16/9535* (2019.01)
*G06N 20/00* (2019.01)
*G06F 16/9032* (2019.01)

(52) U.S. Cl.
CPC ........ *G06F 9/453* (2018.02); *G06F 16/90332* (2019.01); *G06F 16/9535* (2019.01); *G06N 20/00* (2019.01)

(58) Field of Classification Search
CPC .. G06F 9/453; G06F 16/90332; G06F 6/9535; G06F 16/9536; G06F 16/9538; G06F 16/9535; G06F 16/906; G06N 20/00; G06N 3/02; G06N 3/08
See application file for complete search history.

(56) References Cited

U.S. PATENT DOCUMENTS

| | | | | |
|---|---|---|---|---|
| 7,930,302 B2 * | 4/2011 | Bandaru | ................ | G06F 40/30 |
| | | | | 707/737 |
| 8,819,030 B1 * | 8/2014 | Freed | .................... | G06F 16/164 |
| | | | | 707/748 |
| 9,201,868 B1 * | 12/2015 | Zhang | ..................... | G06F 40/30 |
| 9,875,494 B2 * | 1/2018 | Kalns | ..................... | G10L 15/30 |
| 10,038,611 B1 * | 7/2018 | Wu | ......................... | H04L 41/06 |
| 2008/0114759 A1 * | 5/2008 | Yahia | ..................... | G06Q 30/02 |
| 2010/0153324 A1 * | 6/2010 | Downs | .................. | G06F 40/258 |
| | | | | 706/21 |

(Continued)

OTHER PUBLICATIONS

Yirka, Bob, "Using AI to make push-notification apps smarter" (Mar. 21, 2018), Tech Xplore, Retrieved Aug. 10, 2020, https://techxplore.com/news/2018-03-ai-push-notification-apps-smarter.html (Year: 2018).*

*Primary Examiner* — Kieu D Vu
*Assistant Examiner* — Rami R Okasha
(74) *Attorney, Agent, or Firm* — Lee Hong Degerman Kang & Waimey

(57) ABSTRACT

The present disclosure provides an artificial intelligence apparatus including a memory configured to store data input by the user or data received by the artificial intelligence apparatus as user interest data, and a processor configured to extract a keyword from the user interest data, classify the keyword as a concern matching the keyword using an interest classification model, and increase an interest rank weight for the concern.

16 Claims, 8 Drawing Sheets

(56) References Cited

U.S. PATENT DOCUMENTS

| | | | |
|---|---|---|---|
| 2010/0235354 A1* | 9/2010 | Gargaro | G06F 16/9535 707/725 |
| 2011/0029541 A1* | 2/2011 | Schulman | G06F 16/951 707/748 |
| 2011/0145219 A1* | 6/2011 | Cierniak | G06F 16/9535 707/709 |
| 2011/0166852 A1* | 7/2011 | Kim | G06F 40/40 704/9 |
| 2012/0054187 A1* | 3/2012 | Priyadarshan | G06F 16/9535 707/740 |
| 2012/0054627 A1* | 3/2012 | Priyadarshan | G06Q 30/0201 715/738 |
| 2012/0066234 A1* | 3/2012 | Lee | G06F 16/9535 707/749 |
| 2012/0245944 A1* | 9/2012 | Gruber | H04M 1/72547 704/270.1 |
| 2012/0272160 A1* | 10/2012 | Spivack | H04L 43/16 715/752 |
| 2013/0290110 A1* | 10/2013 | LuVogt | G06F 16/9535 705/14.66 |
| 2013/0290339 A1* | 10/2013 | LuVogt | G06Q 10/10 707/740 |
| 2014/0188857 A1* | 7/2014 | Steiner | G06K 9/00677 707/723 |
| 2014/0365885 A1* | 12/2014 | Carson | G06F 16/3344 715/708 |
| 2015/0149469 A1* | 5/2015 | Xu | G06F 16/48 707/740 |
| 2015/0220806 A1* | 8/2015 | Heller | G06F 16/583 382/159 |
| 2015/0293989 A1* | 10/2015 | Bhargava | G06F 7/02 707/737 |
| 2015/0331914 A1* | 11/2015 | Cherukuri | H04L 67/306 707/709 |
| 2016/0042299 A1* | 2/2016 | Liang | G06F 9/451 706/12 |
| 2016/0202889 A1* | 7/2016 | Shin | H04L 51/16 715/758 |
| 2016/0210363 A1* | 7/2016 | Rambhia | G06F 40/205 |
| 2016/0239740 A1* | 8/2016 | Baughman | G06N 20/00 |
| 2016/0283483 A1* | 9/2016 | Jiang | G06F 16/248 |
| 2017/0132019 A1* | 5/2017 | Karashchuk | G06F 3/0482 |
| 2017/0169476 A1* | 6/2017 | Nomula | G06N 20/00 |
| 2017/0177406 A1* | 6/2017 | Chen | G06F 9/4831 |
| 2017/0287127 A1* | 10/2017 | Chung | G06F 16/00 |
| 2017/0308792 A1* | 10/2017 | Liang | G06N 20/00 |
| 2019/0005949 A1* | 1/2019 | Togwe | G06F 40/20 |
| 2019/0065966 A1* | 2/2019 | Vijil | G06Q 30/0201 |
| 2019/0188326 A1* | 6/2019 | Daianu | G06F 40/40 |
| 2019/0251417 A1* | 8/2019 | Bennett | G06N 5/022 |
| 2020/0026776 A1* | 1/2020 | Boss | G06F 16/248 |
| 2020/0175107 A1* | 6/2020 | Banerjee | H04L 16/337 |
| 2020/0184495 A1* | 6/2020 | Samarev | G06Q 30/0202 |
| 2020/0265080 A1* | 8/2020 | Fransen | G06Q 30/0251 |

* cited by examiner

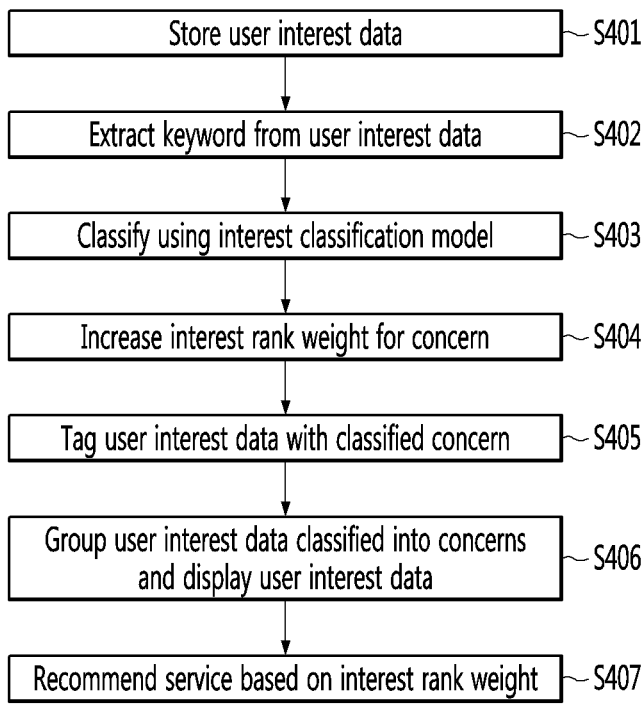
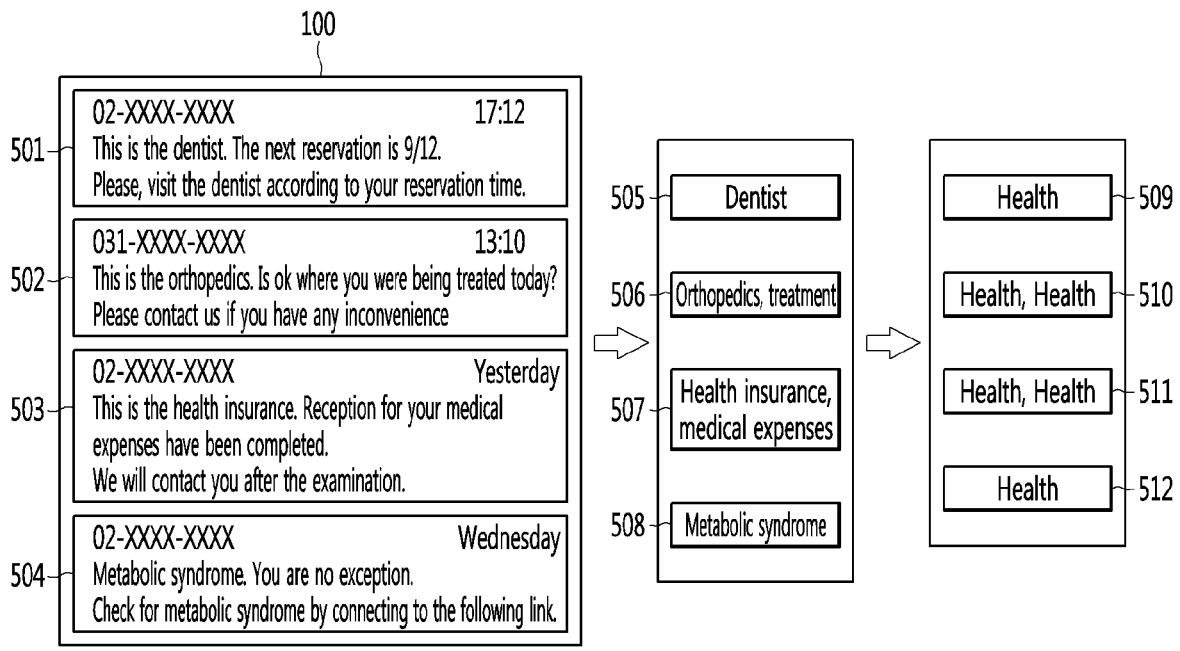

ARTIFICIAL INTELLIGENCE APPARATUS AND METHOD FOR EXTRACTING USER'S CONCERN

CROSS-REFERENCE TO RELATED APPLICATIONS

Pursuant to 35 U.S.C. § 119(a), this application claims the benefit of earlier filing date and right of priority to Korean Patent Application No. 10-2019-0160595, filed on Dec. 5, 2019, the contents of which are hereby incorporated by reference herein in its entirety.

BACKGROUND OF THE INVENTION

1. Field of the Invention

The present disclosure relates to an artificial intelligence apparatus and a method for extracting a user's concern.

2. DISCUSSION OF THE RELATED ART

Artificial intelligence is a field of computer engineering and information technology that research a method for allowing computers to do thinking, learning, self-development or the like that can be done by human intelligence and means that computers are enabled to imitate human intelligent behavior.

In addition, the artificial intelligence does not exist by itself, but is directly or indirectly related to other fields of computer science. Especially, artificial intelligent factors have been introduced in the various field of information technology, and it has been actively attempted to utilize them to solve problems in the field.

On the other hand, techniques for perceiving and learning surrounding environment using artificial intelligence, providing information desired by a user in a desired form, or performing an operation or function desired by the user are being actively studied.

An electronic device providing such various operations and functions may be referred to as an artificial intelligence (AI) apparatus.

On the other hand, with the recent increase in the use of artificial intelligence apparatuses, the amount of data accumulated in artificial intelligence apparatuses has also increased.

However, the artificial intelligence apparatuses merely provide a function of simply storing or retrieving stored user data generated due to the use of the artificial intelligence apparatuses.

Thus, there is an increasing need for new functionality which artificial intelligence apparatuses can provide based on vast amounts of user data.

SUMMARY OF THE INVENTION

The present disclosure aims to solve the above and other problems.

An object of the present disclosure is to provide an artificial intelligence apparatus and a method for extracting a user's concern based on data stored in the artificial intelligence apparatus.

Another object of the present disclosure is to provide an artificial intelligence apparatus and a method for figuring out a user's concern based on data input by a user or data received by the artificial intelligence apparatus.

Still another object of the present disclosure is to provide an artificial intelligence apparatus and a method for extracting a user's concern and grouping and displaying content based on the user's concern.

Still another object of the present disclosure is to provide an artificial intelligence apparatus and a method for figuring out priorities of a user's concerns and recommending a service related to a concern with a high priority.

According to an embodiment of the present disclosure, an artificial intelligence apparatus includes a memory configured to store data input by the user or data received by the artificial intelligence apparatus as user interest data, and a processor configured to extract a keyword from the user interest data, classify the keyword as a concern matching the keyword using an interest classification model, and increase an interest rank weight for the concern.

Furthermore, According to an embodiment of the present disclosure, a method of extracting a user's concern includes storing data input by the user or data received by an artificial intelligence apparatus as user interest data, extracting a keyword from the user interest data, classifying the keyword into a concern matching the keyword using an interest classification mode, and increasing an interest rank weight for the concern.

BRIEF DESCRIPTION OF THE DRAWINGS

FIG. 4 is a flowchart for describing a method of extracting a user's concern according to an embodiment of the present disclosure.

FIGS. 5 and 6 are diagrams for describing a method of extracting a user's concern from text data according to an embodiment of the present disclosure.

DETAILED DESCRIPTION OF THE PREFERRED EMBODIMENTS

Figure 1:
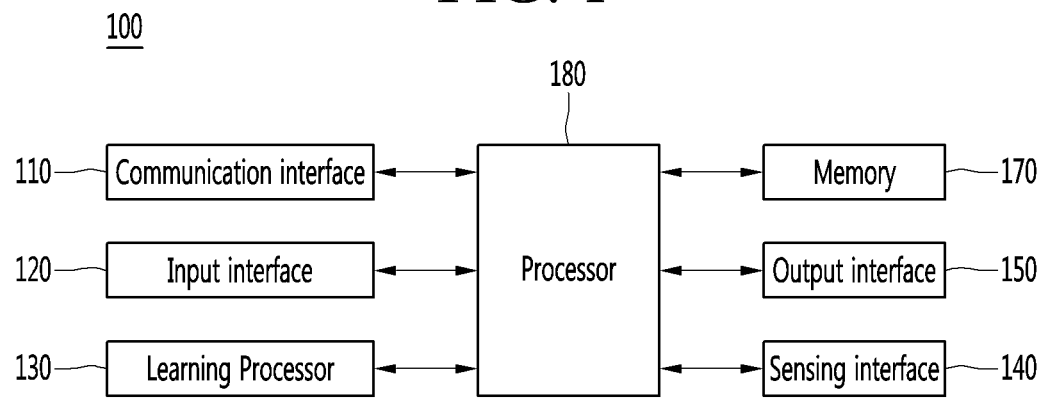
FIG. 1 illustrates an AI apparatus according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function <eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI apparatus according to an embodiment of the present disclosure.

The AI apparatus 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other AI apparatuses 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, learning data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
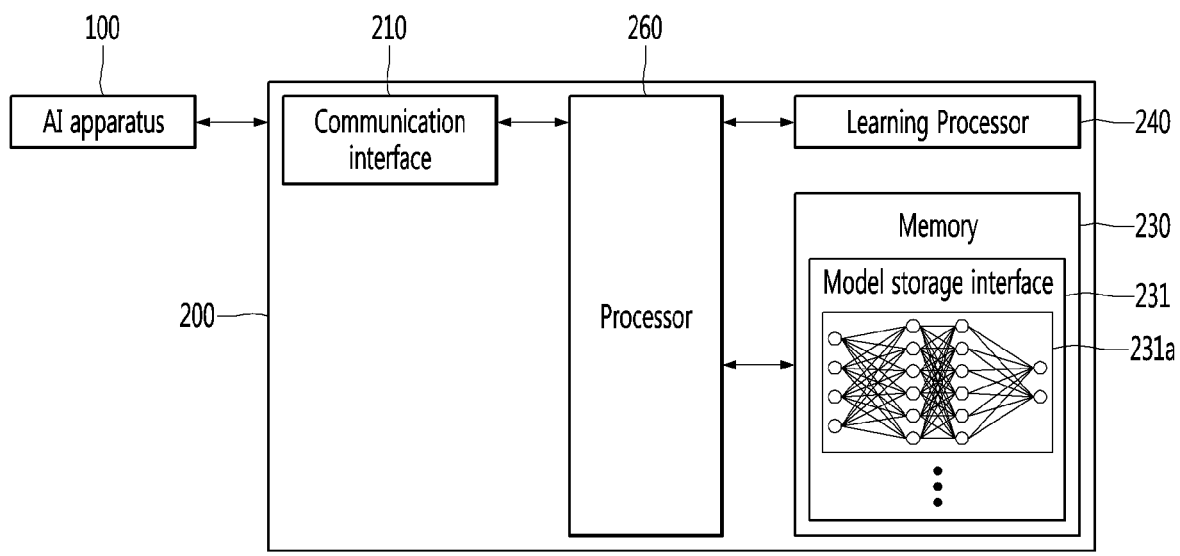
FIG. 2 illustrates an AI server according to an embodiment of the present disclosure.

FIG. 2 illustrates an AI server according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage 231. The model storage interface 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
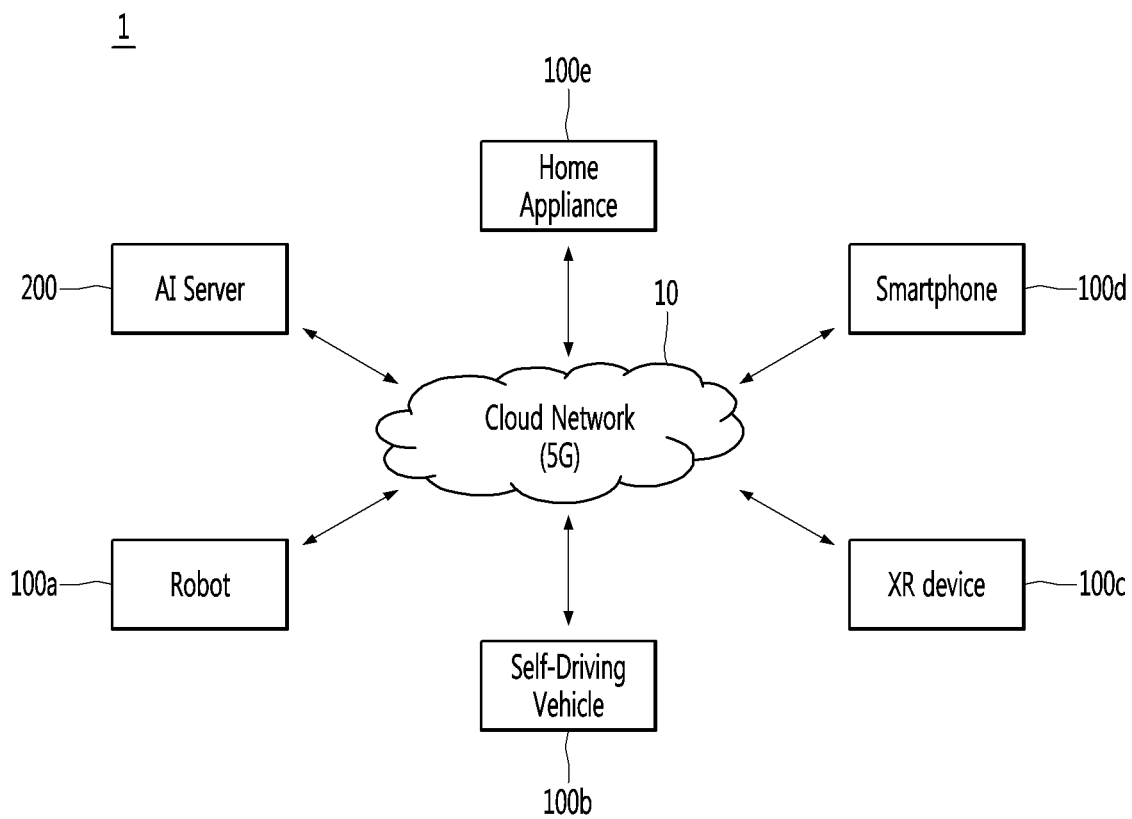
FIG. 3 illustrates an AI system according to an embodiment of the present disclosure.

FIG. 3 illustrates an AI system according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100b or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving interface such that the self-driving vehicle 100b travels along the determined travel route and travel plan. The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

FIG. 4 is a flowchart for describing a method of extracting a user's concern according to an embodiment of the present disclosure.

The memory 170 may store user interest data (S401).

The memory 170 may store data input by the user or data received by the AI apparatus 100 as user interest data.

The user interest data may refer to data that can be used to figure out a user's concern. The user interest data may include at least one of text message data, image data, schedule data, memo data, search data, and application push notification data.

The user interest data may include data input by the user or data received by the AI apparatus 100.

The data input by the user may include at least one of text message data input by the user for sending a text message, image data for a photo or video taken by the camera, schedule data input for schedule management, memo data input for notes, and information, search data input to information search.

In addition, the data input by the user through the artificial intelligence apparatus 100 may include active data which is data that is actively input by the user.

Meanwhile, the data received by the artificial intelligence apparatus 100 may include data received through the communication interface 110 from an external device.

The data received by the artificial intelligence apparatus 100 may include passive data that is not input by the user through the input interface 120 of the artificial intelligence apparatus 100.

For example, the data received by the artificial intelligence apparatus 100 may include at least one of text message data and application push notification data received through the communication interface 100.

The processor 180 may extract a keyword from the user interest data (S402).

The processor 180 may separate and extract a keyword for figuring out a concern of the user from the user interest data.

The processor 180 may extract a keyword from text data included in the user interest data.

The processor 180 may separate and extract a noun from text data included in the user interest data and extract the extracted noun as a keyword.

For example, when the user interest data is text message data, the nouns may be separated and extracted from the text data included in the text message data using a morphological analysis module.

The morphological analysis module may include an artificial neural network (ANN) model used in machine learning. The artificial neural network model may be a model trained by a recurrent neural network (RNN) algorithm such as a convolutional neural network (CNN) or a long-short term memory (LSTM), but is not limited thereto.

The morphological analysis module may output a value tagged with a morphological analysis result for each syllable with respect to the input text data.

The processor 180 may separate and extract a noun from the text data based on the value tagged with the morphological result for each syllable.

Referring to FIG. 5, the user interest data may include first text message data 501, second text message data 502, third text message data 503, and fourth text message data 504.

The processor 180 may extract a keyword from the first text message data 501, the second text message data 502, the third text message data 503, and the fourth text message data 504.

For example, the processor 180 may separate and extract the nouns 'dentist', 'reservation', 'visit', and 'time' from the text data of the first text message data 501 using the morphological analysis module and extract the noun 'dentist' of the extracted nouns as a first keyword 505. The remaining nouns 'reservation', 'visit' or 'time' may also be extracted as keywords, but for convenience of description, it is assumed that the noun 'dentist' is extracted as a keyword. In addition, the processor 180 may separate and extract the nouns 'Orthopedics' and 'treatment' from the text data of the second text message data 502 by using the morphological analysis module, and extract 'orthopedics' and 'treatment' among the extracted nouns as second keywords 506.

In addition, the processor 180 may separate and extract the nouns 'health insurance', 'medical expenses', 'reception', and 'examination' from the text data of the third text message data 503 using the morphological analysis module and extract the nouns 'health insurance' and 'medical expenses' as third keywords 507.

In addition, the processor 180 may separate and extract the nouns 'metabolism syndrome', 'you', 'exception', and 'link' from the text data of the fourth text message data 504 by using the morphological analysis module and extract the noun 'metabolic syndrome' among the nouns as a fourth keyword 508.

Figure 6:
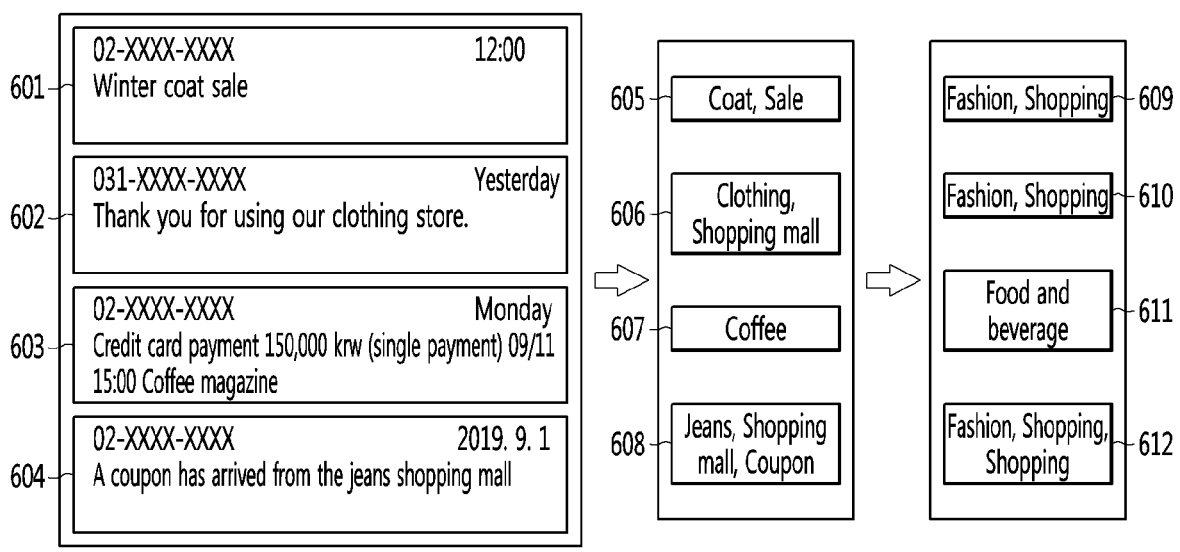

In addition, referring to FIG. 6, the user interest data may include first text message data 601, second text message data 602, third text message data 603, and fourth text message data 604.

The processor 180 may extract a keyword from the first text message data 601, the second text message data 602, the third text message data 603, and the fourth text message data 604.

For example, the processor 180 may separate and extract the noun 'coat' from the text data of the first text message data 601 by using the morphological analysis module and extract the extracted noun 'coat' as a first keyword 605.

Further, the processor 180 may separate and extract the noun 'clothing' from the text data of the second text message data 602 by using the morphological analysis module and extract the extracted noun 'clothing' as a second keyword 606.

In addition, the processor 180 may separate and extract the noun 'fashion' from the text data of the third text message data 603 by using the morphological analysis module and extract the extracted noun 'fashion' as a third keyword 607.

In addition, the processor 180 may separate and extract the noun 'jeans' from the text data of the fourth text message data 604 using the morphological analysis module and extract the extracted noun 'jeans' as a fourth keyword 608.

On the other hand, the processor 180 may extract a keyword based on an object recognized in image data included in the user interest data.

The image data may include a photo or video data.

The processor 180 may obtain a keyword based on the object recognized in the image data using an object recognition model.

The object recognition model may be an artificial neural network model capable of outputting information of objects included in a photo or an image when image data including the photo or the image data is input thereto.

The object recognition model may be composed of artificial neurons (nodes) that form a network by the coupling of synapses. The object recognition model may be defined by a connection pattern between neurons of other layers, a learning process of updating model parameters, and an activation function for generating an output value.

The object recognition model may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

The object recognition model may be generated through supervised learning, unsupervised learning, or reinforcement learning according to a learning method.

Figure 7:
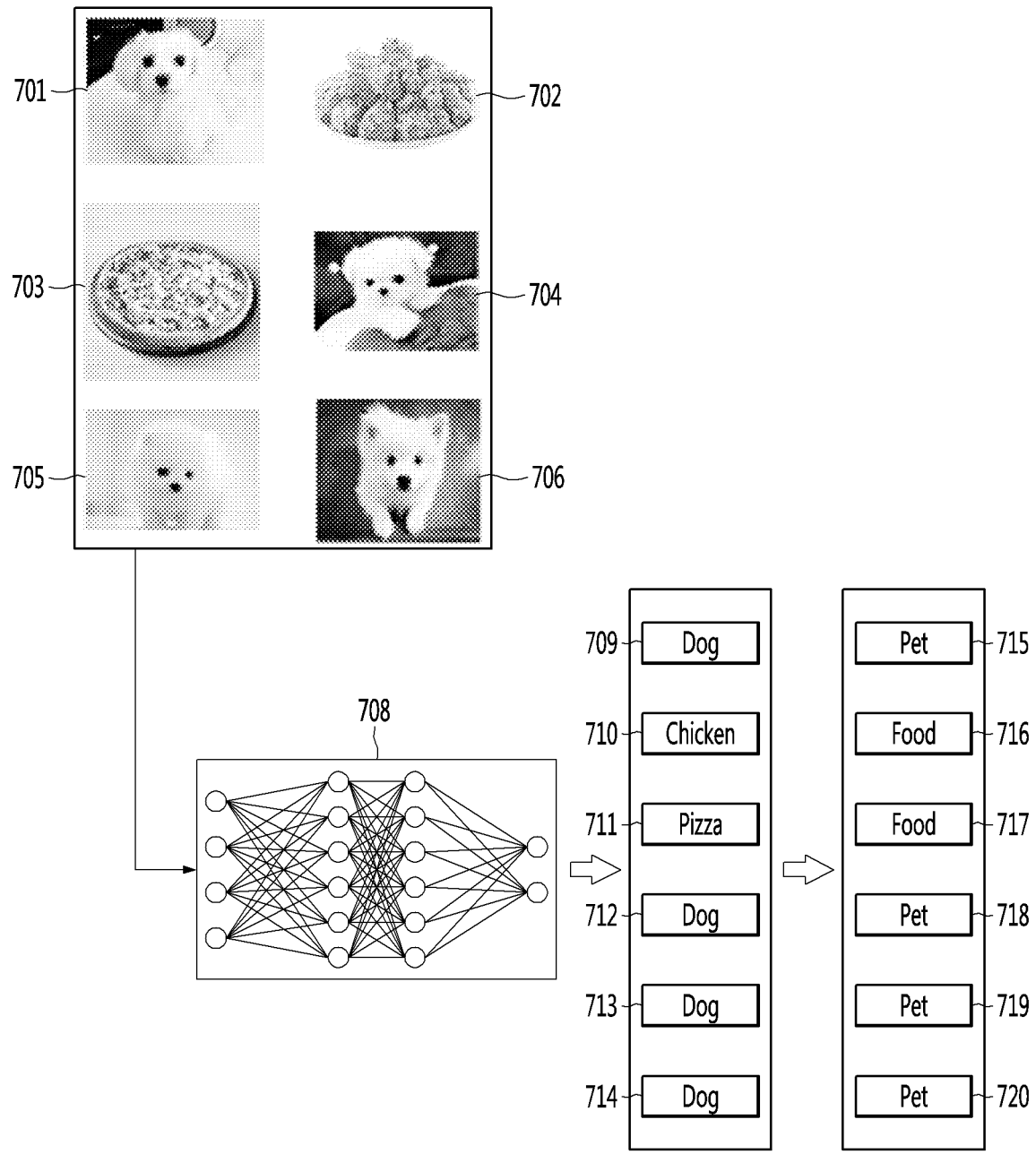
FIG. 7 is a diagram for describing a method of extracting a user's concern from image data according to an embodiment of the present disclosure.

Referring to FIG. 7, the processor 180 may obtain a keyword 709, 710, 711, 712, 713 or 714 based on an object recognized in image data 701, 702, 703, 704, 705, or 706 included in at least one or more pieces of user interest data using the object recognition model 708.

For example, the processor 180 may extract a first keyword 'dog' based on a dog animal object recognized in the first image data 701 using the object recognition model 708.

In addition, the processor 180 may extract a second keyword 'chicken' based on a chicken food object recognized in the second image data 702 using the object recognition model 708.

In addition, the processor 180 may extract a third keyword 'pizza' based on a pizza food object recognized in the third image data 703 using the object recognition model 708. In addition, the processor 180 may extract a fourth keyword 'dog' based on a dog animal object recognized in the fourth image data 704 using the object recognition model 708. In addition, the processor 180 may extract a fifth keyword 'dog' based on a dog animal object recognized in the fifth image data 705 using the object recognition model 708. In addition, the processor 180 may extract a sixth keyword 'dog' based on a dog animal object recognized in the sixth image data 706 using the object recognition model 708.

On the other hand, the processor 180 may extract a keyword from application push notification data.

The application push notification data may include at least one of name data of an application, category data of the application, and push message data.

The application push notification data may be notification data generated by an application installed to run in the artificial intelligence apparatus 100. The application may generate notification data using data received from an external server (not shown).

In addition, each of applications installed in the artificial intelligence apparatus 100 may provide a push notification according to a push notification permission setting.

For example, the processor 180 may allow the application not to provide a push notification in the case of receiving a setting for stopping push notification for the application.

In addition, the processor 180 may provide the push notification only in the case of receiving a setting for permitting push notification for the application.

Therefore, since the user may directly select whether to permit the push notification of the application, the push notification data of the application may be data from which the user's concerns are capable of being accurately extracted.

Figure 8:
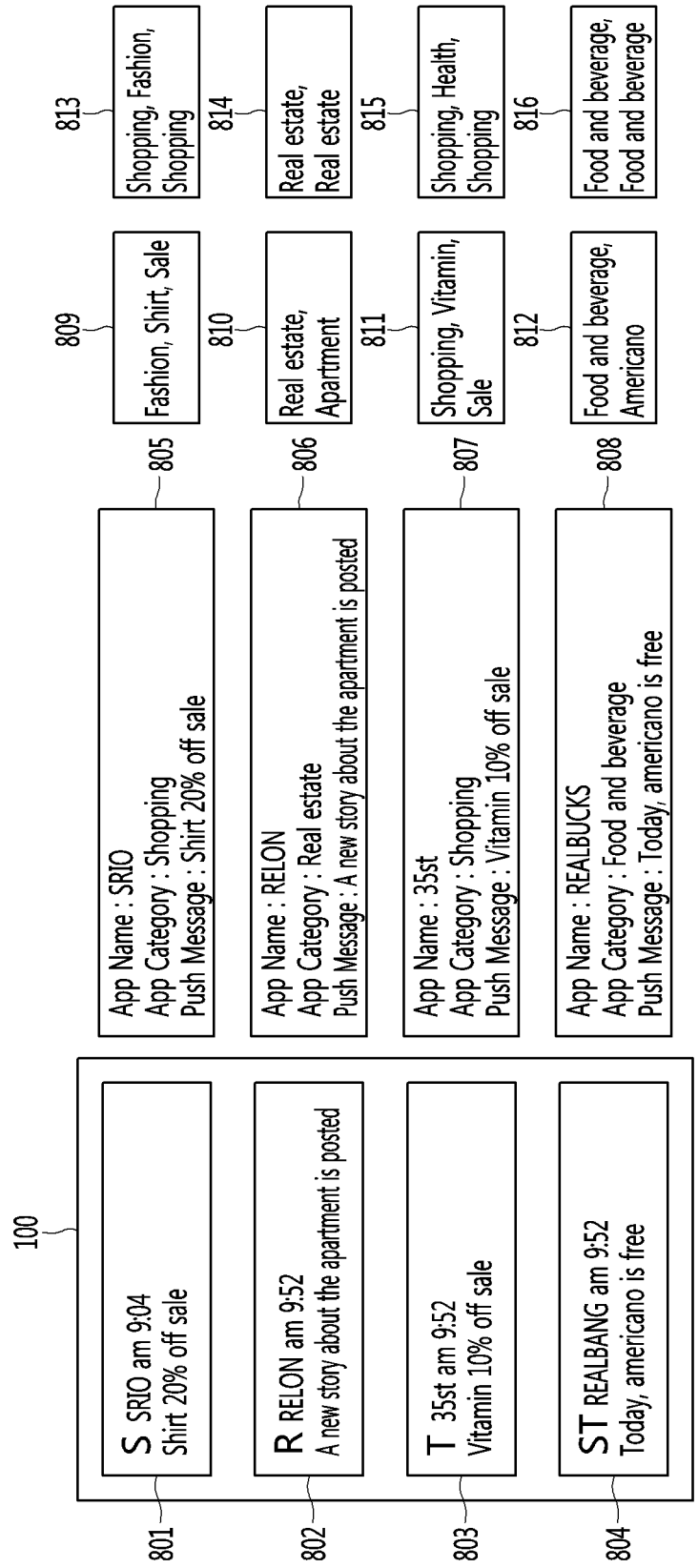
FIG. 8 is a diagram for describing a method of extracting a user's concern from application push notification data according to an embodiment of the present disclosure.

Referring to FIG. 8, the application push notification 801, 802, 803 or 804 may include application push notification data including name data of the application, category data of the application, and application push message data.

The first push notification 801 may include first application push notification data 805 including name data 'SRIO' of an application, category data 'shopping' of the application and the push message data 'shirt 20% off sale' of the application.

The second push notification 802 may include second application push notification data 806 including name data 'RELON' of an application, category data 'real estate' of the application, and the push message data 'a new story about the apartment is posted' of the application. The third push notification 803 may include third application push notification data 807 including name data '35st' of an application, category data 'shopping' of the application and the push message data 'vitamin 10% off sale' of the application.

The fourth push notification 804 may include fourth application push notification data 808 including the name data 'REALBUCKS' of an application, the category data 'food and beverage' of the application, and the push message data 'Today, Americano is free' of the application.

The processor 180 may extract first keywords 'shopping, shirt, sale' 809 from the category data 'shopping' and the push message data 'shirt 20% off sale' included in the first application push notification data 805 using the morphological analysis module.

In addition, the processor 180 may extract second keywords 'real estate, apartment' 810 from the category data 'real estate' and the push message data 'a new story about the apartment is posted' included in the second application push notification data 806 using the morphological analysis module.

Furthermore, the processor 180 may extract third keywords 'shopping, vitamin, sale' 811 from the category data 'shopping' and the push message data 'vitamin 10% off sale' included in the third application push notification data 807 using the morphological analysis module.

Furthermore, the processor 180 may extract second keywords 'food and beverage, Americano' 812 from the category data 'food and beverage' and the push message data 'Today, Americano is free' included in the fourth application push notification data 808 using the morphological analysis module.

The processor 180 may classify the extracted keyword into a concern that matches the keyword using an interest classification model (S403).

The processor 180 may classify at least one keyword which is extracted into concerns respectively matching at least one or more keywords using the interest classification model.

The interest classification model may be an artificial neural network model used in machine learning.

When the interest classification model is generated through supervised learning, the interest classification model may be trained in a state in which a label for training data is given. The label may mean a correct answer (or result value) that the artificial neural network should infer when the training data is input to the artificial neural network.

For example, the interest classification model may be a model trained using at least one or more keywords and training data labeled with concern information respectively matching the at least one or more keywords.

For example, concern information that is labeled in the training data may include concern information, such as, 'health', 'fashion', 'shopping', 'food and beverage', 'pet', 'food', 'real estate', 'art', 'culture', 'economic', 'sports', 'social', 'life', 'education', 'beauty', and 'travel'.

In addition, the training data may include keyword data labeled for each concern. For example, the training data may include data labeled with concern information 'fashion' for keywords 'fashion, clothing, jeans, shirt, coat', and the like.

Therefore, when a new keyword is input, the interest classification model may output a concern that matches the corresponding keyword.

Referring to FIG. 5, the processor 180 may classify a first keyword 'dentist' 505 into a first concern 'health' 509 that matches the first keyword 'dentist' 505 using the interest classification model.

In addition, the processor 180 may classify a second keyword 'orthopedics, treatment' 506 into a second concern 'health, health' 510 that matches the second keywords 'orthopedics, treatment' 506 using the interest classification model. When there is a plurality of keywords extracted from the user interest data, the processor 180 may classify a plurality of keywords into concerns respectively matching the plurality of keywords using the interest classification model.

In addition, the processor 180 may classify a third keyword 'health insurance, medical expenses' 507 into a third concern 'health, health' 511 that matches the third keywords 'health insurance and medical expenses' 507 using the interest classification model.

In addition, the processor 180 may classify a fourth keyword 'metabolism syndrome' 508 into a fourth concern 'health' 512 that matches the fourth keyword 'metabolism syndrome' 508 using the interest classification model.

In addition, referring to FIG. 6, the processor 180 may classify a first keyword 'coat, sale' 605 into a first concern 'fashion, shopping' 609 that matches the first keyword 'coat, sale' 605 using the interest classification model.

In addition, the processor 180 may classify second keywords 'clothing, shopping mall' 606 into a second concern 'fashion, shopping mall' 610 that matches the second keywords 'clothing, shopping mall' 606 using the interest classification model.

In addition, the processor 180 may classify a third keyword 'coffee' 607 into a third concern 'food and beverage' 611 matching the third keyword 'coffee' 607 using the interest classification model.

In addition, the processor 180 may classify fourth keywords 'jeans, shopping mall, coupon' 608 into a fourth concern 'fashion, shopping, shopping' 612 that matches the fourth keywords 'jeans, shopping mall, coupon' 608 using the interest classification model.

In addition, referring to FIG. 7, the processor 180 may respectively classify a first keyword 'dog' 709, a second keyword 'chicken' 710, a third keyword 'pizza' 711, a fourth keyword 'dog' 712, a fifth keyword 'dog' 713, and a sixth keyword '714' into a first concern 'pet' 715, a second concern 'food' 716, a third concern 'food' 717, a fourth concern 'pet' 718, a fifth concern 'pet' 719, and a sixth concern 'pet' 720, respectively, using the interest classification model.

In addition, referring to FIG. 8, the processor 180 may classify the first keyword 'shopping, shirt, sale' 809, the second keyword 'real estate, apartment' 810, the third keyword 'shopping, vitamin, sale' 811, and the fourth keyword 'food and beverage, Americano' 812 into the first concern 'shopping, fashion' 813, the second concern 'real estate, real estate' 814, the third concern 'shopping, health, shopping'

815, the fourth concern 'food and beverage, food and beverage' 816, respectively, using the interest classification model.

The processor 180 may increase an interest rank weight for the classified concerns (S404).

The processor 180 may classify keywords into concerns that match the keywords extracted from at least one or more pieces of user interest data and increase interest rank weights for the classified concerns. Therefore, the artificial intelligence apparatus 100 may obtain concerns, in which the user takes an interest, according to the orders of ranks.

The processor 180 may classify the extracted keyword into a matched concern and assign a predetermined score each time the keyword is classified into the concern to increase an interest rank weight but is not limited thereto.

For example, referring to FIG. 5, the processor 180 may assign one point, which is a predetermined score, whenever the extracted keyword is classified into a concern 'health'. Accordingly, the processor 180 may assign an interest rank weight of six points to the interest 'health'. In addition, referring to FIG. 6, the processor 180 may assign one point, which is a predetermined score, whenever the extracted keyword is classified into a concern 'fashion, shopping, food and beverage'. Accordingly, the processor 180 may assign the interest rank weight of three points to the concern 'fashion', the interest rank weight of four points to the concern 'shopping', and the interest rank weight of one point to the concern 'food and beverage.'

In addition, the processor 180 may determine whether the user interest data corresponds to active data input by the user or passive data received by the artificial intelligence apparatus, and additionally increase an interest rank weight when the user interest data is active data.

Referring to FIG. 7, the processor 180 may determine whether the image data 701, 702, 703, 704, 705 or 706 corresponds to active data photographed by a user using a camera of the artificial intelligence apparatus 100 or passive data received through the communication interface 110 of the artificial intelligence apparatus 100.

For example, when the first image data 701 is active data photographed through the camera of the artificial intelligence apparatus 100, there is a possibility that the first image data 701 is an image photographing an object in which the user takes an interest because the user directly photographs the first image data.

In addition, for example, when the second image data 702 is passive data received through the communication interface 110, a degree of interest of the user may be likely to be lower than that of the object directly photographed by the user because the user does not directly photograph the second image data.

Therefore, when the keyword 'dog' 709 extracted from the first image data 701 which is active data is classified into the concern 'pet' 715, the processor 180 may increase the interest rank weight of the concern 'pet' to a higher weight whenever a concern is classified from passive data Meanwhile, referring to FIG. 8, the processor 180 may assign one point, which is a predetermined score, whenever the extracted keyword is classified into a concern 'fashion, shopping, food and beverage, real estate, and health'. Thus, the processor 180 may assign the interest rank weight of one point to the concern 'fashion', the interest rank weight of four points to the concern 'shopping', the interest rank weight of two points to the concern 'food and beverage', the interest rank weight of two points to the concern 'real estate' and the interest rank weight of one point to the concern 'health.'

In addition, when a setting for stopping a push notification for the application is input, the processor 180 may decrease an interest rank weight for a concern that matches a keyword extracted from the push notification data of the application for which the push notification is stopped.

Referring to FIG. 8, when a setting for stopping push notification is input for an application 'RELON', the processor 180 may decrease an interest rank weight for the concern 814 that matches the keyword 810 extracted from the push notification data 806 of the application 'RELON' for which the push notification is stopped is inputted. For example, the processor 180 may decrease the interest rank weight of two points for the concern 'real estate'.

Therefore, the artificial intelligence apparatus 100 may figure out a change in the interest rank of the user by reflecting a push notification stopped according to a change in the concern of the user.

On the other hand, the processor 180 may tag the user interest data with a classified concern (S405).

The processor 180 may classify one or more pieces of user interest data into concerns that match the user interest data.

For example, referring to FIG. 5, the processor 180 may tag the user interest data 501, 502, 503 and 504 with the classified concern 'health' 509, 510, 511 and 512, respectively.

In addition, referring to FIG. 7, the processor 180 may tag the user interest data 701, 704, 705, and 706, which are image data, with the classified concerns 'pet' 715, 718, 719, and 720, respectively. In addition, the processor 180 may tag the user interest data 702 and 703, which are image data, with the classified concern 'food' 716 and 717, respectively.

Meanwhile, the display interface of the output interface 150 may group and display user interest data classified according to concerns (S406).

The display interface (not shown) may display (output) information processed by the artificial intelligence apparatus 100. For example, the display interface 151 may display execution screen information of an application program running on the artificial intelligence apparatus 100, or UI (User Interface) or Graphic User Interface (GUI) information according to the execution screen information.

The display interface may group and display at least one piece of user interest data classified according to at least one concern.

Figure 9:
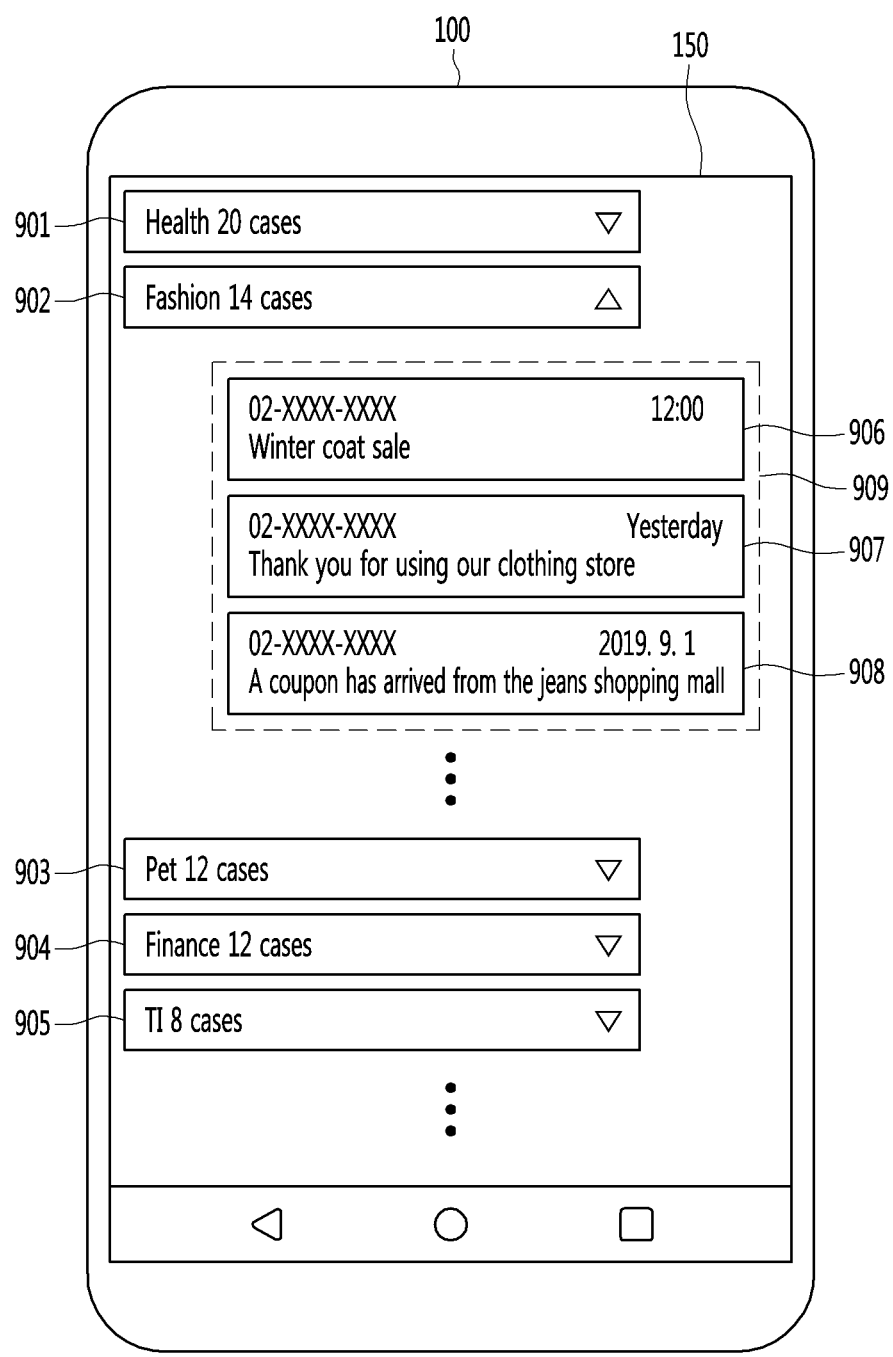
FIGS. 9 and 10 are diagrams for describing a method of grouping user interest data according to a user's concerns and displaying the user interest data according to an embodiment of the present disclosure.

Referring to FIG. 9, when the user interest data is text message data, the display interface of the output interface 150 may display a plurality of concerns 'health, fashion, pet, finance, and IT' 901, 902, 903, 904, and 905. In addition, the display interface may group the plurality of user interest data 906, 907, and 908 into the concern 'fashion' 902 (909) and display the same.

Figure 10:
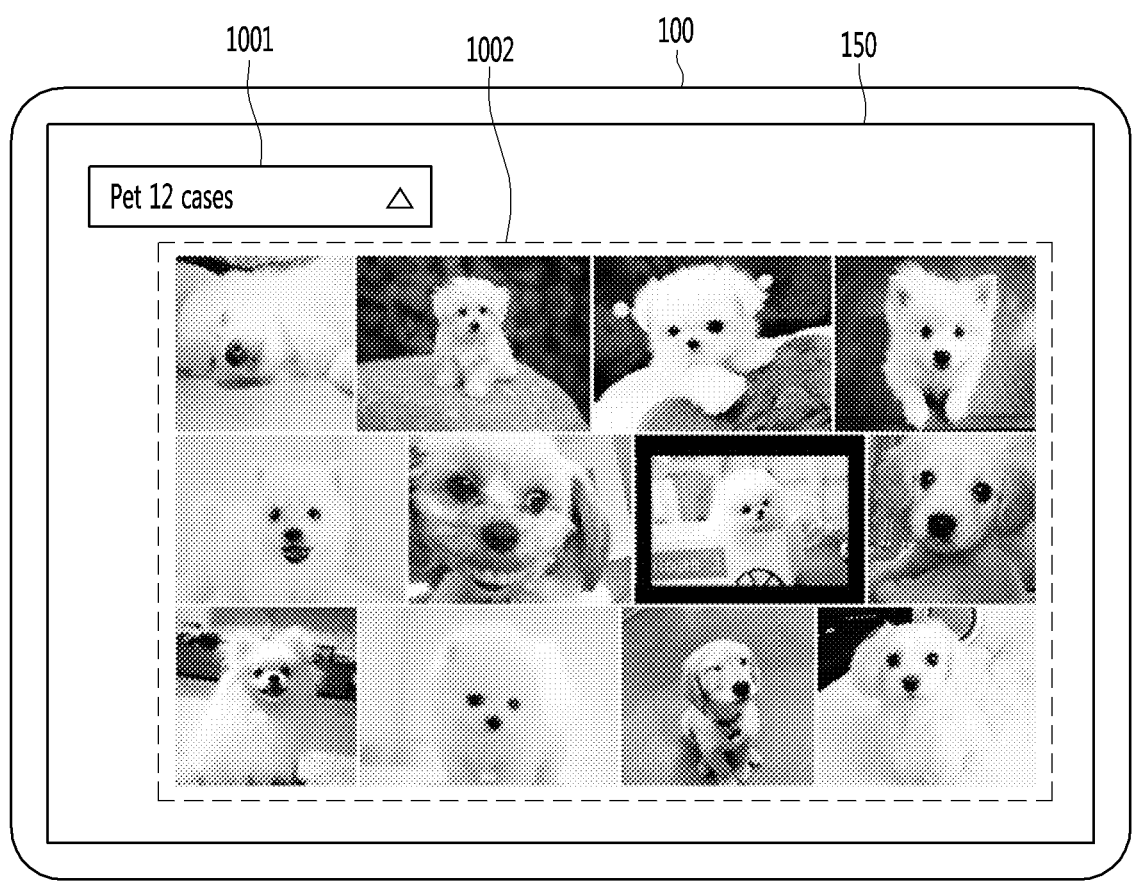

In addition, referring to FIG. 10, when the user interest data is image message data, the display interface of the output interface 150 may group the image data for a plurality of dog objects into the concern 'pet' 1001 and display the same.

Therefore, the artificial intelligence apparatus 100 may group and display user interest data by concerns, thus increasing user convenience.

The processor 180 may determine a recommended service based on the interest rank weight of each of the at least one or more concerns.

The recommended service may include advertisement information received through an application installed in the artificial intelligence apparatus 100 or the communication interface 110.

For example, when the concern having the highest interest rank weight is 'health', the processor 180 may determine, as the recommended service, an application whose application category data is 'health' among applications installed in the artificial intelligence apparatus 100.

For example, when the concern having the highest interest rank weight is 'food and beverage', the processor 180 may determine, as a recommended service, advertisement information related to 'food and beverage' among pieces of advertisement information received through the communication interface 110 and display the advertisement information related to 'food and beverage' on a display.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. In addition, the computer may include a processor 180.

According to the embodiments of the present disclosure, it is possible to figure out a user's concern by extracting the user's concern based on the user's interest data.

Furthermore, according to the various embodiments of the present disclosure, it is possible to group, and display content based on the concern of the user, thus improving the convenience of use of the artificial intelligence apparatus.

Furthermore, according to the various embodiments of the present disclosure, it is possible to figure out a user's concern accurately by identifying the user's concern based on data input by the user or data received by the artificial intelligence apparatus.

Furthermore, according to the various embodiments of the present disclosure, it is possible to recommend a service related to a user's concern with a high priority by figuring out priorities of the user's concerns, thus increasing the satisfaction of the artificial intelligence apparatus.

What is claimed is:

1. An artificial intelligence apparatus for extracting a user concern, comprising:
    a camera configured to capture image data;
    a communication interface configured to transmit and receive data to and from external devices;
    a memory configured to store user interest data comprising active data or passive data, wherein the active data corresponds to image data captured by the user using the camera and the passive data corresponds to image data received by the artificial intelligence apparatus through the communication interface; and
    a processor configured to:
    extract keywords from the user interest data using an object recognition model by extracting at least a first keyword based on recognizing a first object from first image data using the object recognition model and extracting a second keyword based on recognizing a second object from second image data using the object recognition model, wherein the user interest data comprises at least the first image data and the second image data,
    classify the extracted keywords as concerns matching the extracted keywords using an interest classification model by at least classifying the first keyword as a first concern matching the first keyword using the interest classification model and classifying the second keyword as a second concern matching the second keyword using the interest classification model,
    increase an interest rank weight correlated to a level of interest for the classified concerns with respect to the user, and
    determine whether each of the first image data and the second image data corresponds to the active data or the passive data,
    wherein the interest rank weight of the first concern is increased to be higher than the interest rank weight of the second concern based on a determination that the first image data corresponds to the active data and the second image data corresponds to the passive data.

2. The artificial intelligence apparatus of claim 1, wherein the user interest data comprises at least one of text message data, image data, scheduling data, memo data, search data, or application push notification data.

3. The artificial intelligence apparatus of claim 1, wherein a third keyword among the keywords is extracted from the user interest data by extracting a noun from text data in the user interest data and extracting the extracted noun as the keyword.

4. The artificial intelligence apparatus of claim 2, wherein the application push notification data comprises category data and push message data of an application, and
    wherein the processor is further configured to extract at least one keyword from the category data and the push message data and to classify the at least one keyword into a concern that matches each of the at least one keyword using the interest classification model.

5. The artificial intelligence apparatus of claim 4, wherein the processor is further configured to decrease an interest rank weight for a concern matching a keyword extracted from the push notification data of the application when a setting for suspending push notification is input for the application.

6. The artificial intelligence apparatus of claim 1, wherein the processor is further configured to tag the user interest data with data about the classified concerns.

7. The artificial intelligence apparatus of claim 6,
    wherein the processor is further configured to group at least one user interest data classified into at least one concern according to concerns and to cause a display of the at least one user interest data according to the at least one concern.

8. The artificial intelligence apparatus of claim 1, wherein the processor is further configured to determine a recommended service based on the interest rank weight of the classified concerns.

9. A method of extracting a user concern, the method comprising:
    capturing image data with a camera;
    receiving image data from external devices through a communication interface;
    storing user interest data comprising active data or passive data, wherein the active data corresponds to image data input by the user using the camera and the passive data corresponds to image data received by an artificial intelligence apparatus through the communication interface;
    extract keywords from the user interest data using an object recognition model by extracting at least a first keyword based on recognizing a first object from first image data using the object recognition model and extracting a second keyword based on recognizing a second object from second image data using the object recognition model, wherein the user interest data comprises at least the first image data and the second image data;

classify the extracted keywords as concerns matching the extracted keywords using an interest classification model by at least classifying the first keyword as a first concern matching the first keyword using the interest classification model and classifying the second keyword as a second concern matching the second keyword using the interest classification model;

increase an interest rank weight correlated to a level of interest for the classified concerns with respect to the user; and determining whether each of the first image data and the second image data corresponds to the active data or the passive data, wherein the interest rank weight of the first concern is increased to be higher than the interest rank weight of the second concern based on a determination that the first image data corresponds to the active data and the second image data corresponds to the passive data.

10. The method of claim 9, wherein the user interest data comprises at least one of text message data, image data, scheduling data, memo data, search data, or application push notification data.

11. The method of claim 9, wherein a third keyword among the keywords is extracted from the user interest data by extracting a noun from text data in the user interest data and extracting the extracted noun as the keyword.

12. The method of claim 10, wherein the application push notification data comprises at least one of name data, category data, or push message data of an application, and wherein the extracting of the keyword includes extracting at least one keyword from the category data and the push message data included in the application push notification data.

13. The method of claim 12, further comprising:

receiving a setting for suspending reception of a push notification for the application; and decreasing an interest rank weight for a concern matching a keyword extracted from the push notification data of the application.

14. The method of claim 9, further comprising:

tagging the user interest data with data about the classified concerns.

15. The method of claim 14, further comprising:

grouping at least one user interest data classified into at least one concern according to concerns and displaying the at least one user interest data according to the at least one concern.

16. The method of claim 9, further comprising:

determining a recommended service based on the interest rank weight of the classified concerns.

* * * * *